United States Patent
Hsia (10) Patent No.: US 9,368,994 B2
(45) Date of Patent: Jun. 14, 2016

(54) DYNAMIC CHARGING DEVICE AND METHOD THEREOF

(71) Applicant: Wistron Corporation, New Taipei (TW)

(72) Inventor: Wen-Nan Hsia, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 706 days.

(21) Appl. No.: 13/794,829

(22) Filed: Mar. 12, 2013

(65) Prior Publication Data

US 2014/0009107 A1    Jan. 9, 2014

(30) Foreign Application Priority Data

Jul. 6, 2012    (TW) .............................. 101124388 A (51) Int. Cl.
*H02J 7/00* (2006.01)

(52) U.S. Cl.
CPC ............... *H02J 7/007* (2013.01); *H02J 7/0068* (2013.01)

(58) Field of Classification Search
USPC ........................................................ 320/107
See application file for complete search history.

(56) References Cited

U.S. PATENT DOCUMENTS

| 5,818,202 | A | * | 10/1998 | Miyamoto | ............ | H01M 10/44 |
| | | | | | | 320/125 |
| 6,075,339 | A | * | 6/2000 | Reipur | .............. | H01M 10/4257 |
| | | | | | | 320/110 |
| 6,424,123 | B1 | * | 7/2002 | Odaohhara | ........... | H02J 7/0073 |
| | | | | | | 320/134 |
| 7,375,491 | B2 | * | 5/2008 | Lin | ........................ | H02J 7/0073 |
| | | | | | | 320/107 |
| 7,990,106 | B2 | * | 8/2011 | Hussain | .................. | H02J 7/045 |
| | | | | | | 320/128 |
| 2006/0145658 | A1 | * | 7/2006 | Wang | .................... | H02J 7/0047 |
| | | | | | | 320/107 |
| 2006/0273764 | A1 | | 12/2006 | Huang | | |
| 2011/0279079 | A1 | * | 11/2011 | Do Valle | .................. | H02J 7/04 |
| | | | | | | 320/107 |

FOREIGN PATENT DOCUMENTS

| CN | 201656501 U | 11/2010 |
| CN | 102214941 A | 10/2011 |
| TW | 201031069 | 8/2010 |
| TW | 1336158 | 1/2011 |

OTHER PUBLICATIONS

Office action mailed on Jan. 14, 2015 for the Taiwan application No. 101124388, filing date Jul. 6, 2012, p. 1 line 14, p. 2-6 and p. 7 line 1-24.
Office action mailed on Jan. 12, 2015 for the China application No. 201210248824.1, p. 3 line 2~30 and p. 4-8.

* cited by examiner

*Primary Examiner* — Yalkew Fantu
(74) *Attorney, Agent, or Firm* — Winston Hsu; Scott Margo (57) ABSTRACT

A dynamic charging device includes a detection module for generating a detection signal according to an input signal, a control module coupled to the detection module for generating a control signal according to the detection signal, and an output module coupled to the control module for dynamically adjusting amounts of the input signal according to the control signal and the input signal, so as to process a charging operation for a load module, wherein the input signal is an input current or a voltage source.

22 Claims, 7 Drawing Sheets

DYNAMIC CHARGING DEVICE AND METHOD THEREOF

BACKGROUND OF THE INVENTION

1. Field of the Invention

The present disclosure relates to a dynamic charging device and method, and more particularly, to a dynamic charging device and method which can dynamically adjust amounts of an input signal to process a charging operation for a load module.

2. Description of the Prior Art

Portable electronic devices have been continuously developed to satisfy different requirements, such as business trips or recreational entertainments, such that larger battery capabilities and convenient means for charging the portable electronic devices have become the focuses of various manufacturers. Generally, one of the common means for charging the portable electronic devices is to directly connect the portable electronic devices with a DC/AC power supply or a converter, the other is to utilize the universal serial bus (USB) to bridge the portable electronic devices with a personal computer, so as to finish the charging operation of the portable electronic devices.

However, it is inconvenient for users to always carry the converter for accessing DC/AC power supplies. Besides, the means for charging via the USB to connect the portable electronic devices with the personal computer has the limitation that amounts of additional charging currents provided by the personal computer can be limited due to operation of the personal computer. Under such circumstances, the users have to comply with requirements of the USB transmission to process the charging via the additional charging currents, such as from 500 micro Amperes (mA) to 1000 mA. When the personal computer or the converter is capable of supplying extra charging currents but the users cannot adaptively change the predetermined limitations of the additional charging currents, the portable electronic devices will not utilize the extra charging currents to shorten the charging period of the portable electronic devices. Besides, when the users utilize charging currents being larger than the limitations of the additional charging currents, the personal computer may fail to maintain the minimum operational current for functional operation of the personal computer, so as to result in an inadvertent shutdown of the personal computer. If the portable electronic device is a projector or a lighting device and the users have the extra requirement to operate the projector or the lighting device under a larger outputting power, the limitation of the charging currents via the USB can further limit operations of the portable electronic devices.

Therefore, it has become an important issue to provide a dynamic charging device and method which can set up operations for dynamically adjusting amounts of charging currents, so as to provide a more convenient charging means for the portable electronic devices and to utilize larger charging currents to process the charging operation for different load modules.

SUMMARY OF THE INVENTION

It is therefore an objective of the disclosure to provide a dynamic charging device and method for setting up operations which can dynamically adjust amounts of charging currents to provide a more convenient charging means and to utilize larger charging currents, so as to process the charging operation for different load modules.

An embodiment of the disclosure discloses a dynamic charging device comprising a detection module for generating a detection signal according to an input signal, a control module coupled to the detection module for generating a control signal according to the detection signal, and an output module coupled to the control module for dynamically adjusting amounts of the input signal according to the control signal and the input signal, so as to process a charging operation for a load module, wherein the input signal is an input current or a voltage source.

An embodiment of the disclosure also discloses another dynamic charging method for a dynamic charging device comprising generating a detection signal according to an input signal, generating a control signal according to the detection signal, and dynamically adjusting amounts of the input signal according to the control signal and the input signal, so as to process a charging operation for a load module, wherein the input signal is an input current or a voltage source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
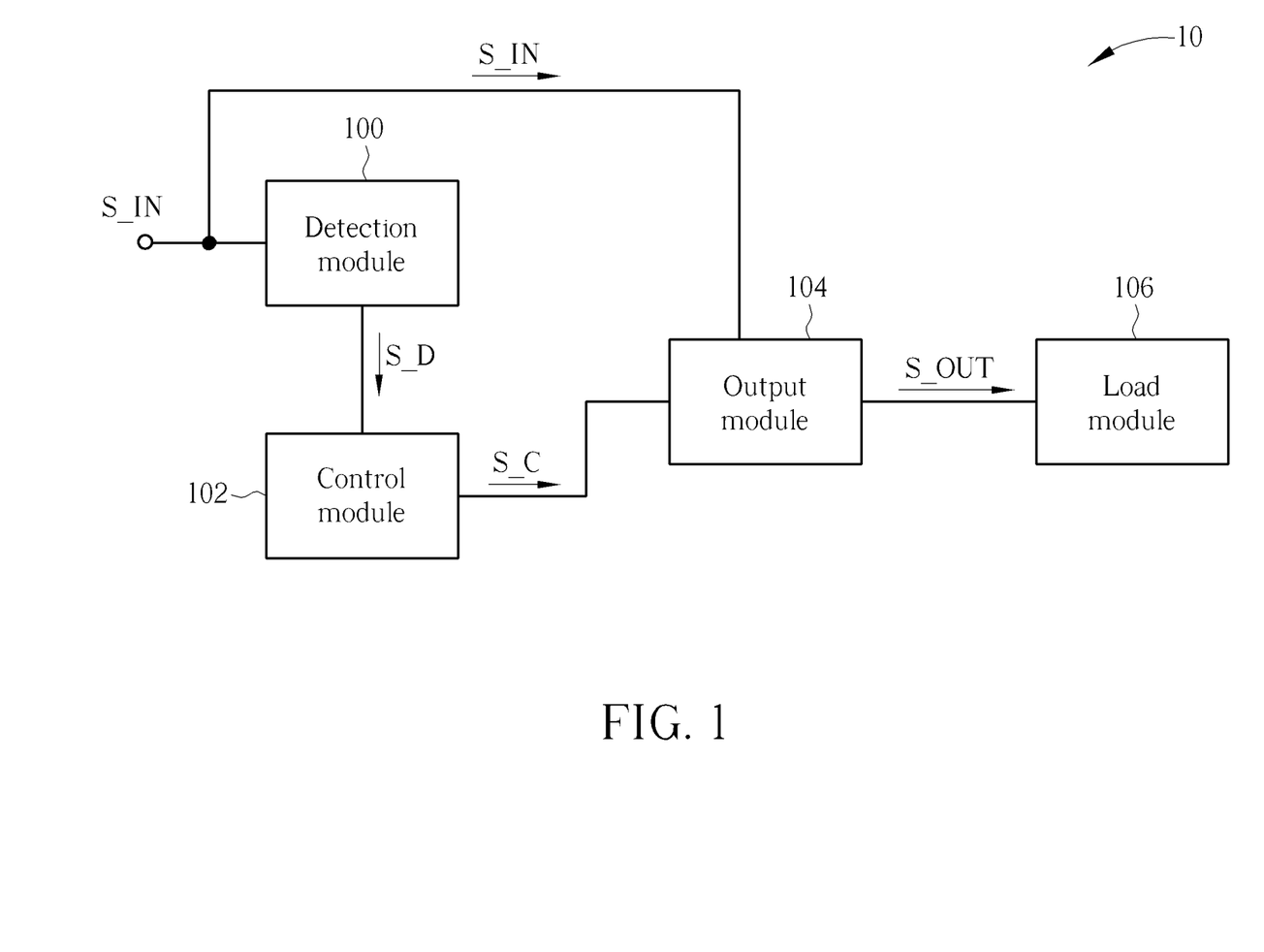
FIG. 1 illustrates a schematic diagram of a dynamic charging device according to an embodiment of the disclosure.

Please refer to FIG. 1, which illustrates a schematic diagram of a dynamic charging device 10 according to an embodiment of the disclosure. As shown in FIG. 1, the dynamically charging device 10 comprises a detection module 100, a control module 102, an output module 104 and a load module 106. An input signal S_IN can be an input current or a power source (not shown in the figure) to provide a stable voltage. The detection module 100 generates a detection signal S_D according to the input signal S_IN. The control module 102 is coupled to the detection module 100 and generates a control signal S_C according to the detection signal SD_D. The output module 104 is coupled to the control module 102 and receives the input current or the power source to dynamically adjust amounts of the input signal S_IN according to the input signal S_IN and the control signal S_C, so as to output an output signal S_OUT (i.e. the adjusted input signal S_IN) to process a charging operation for the load module 106.

Figure 2:
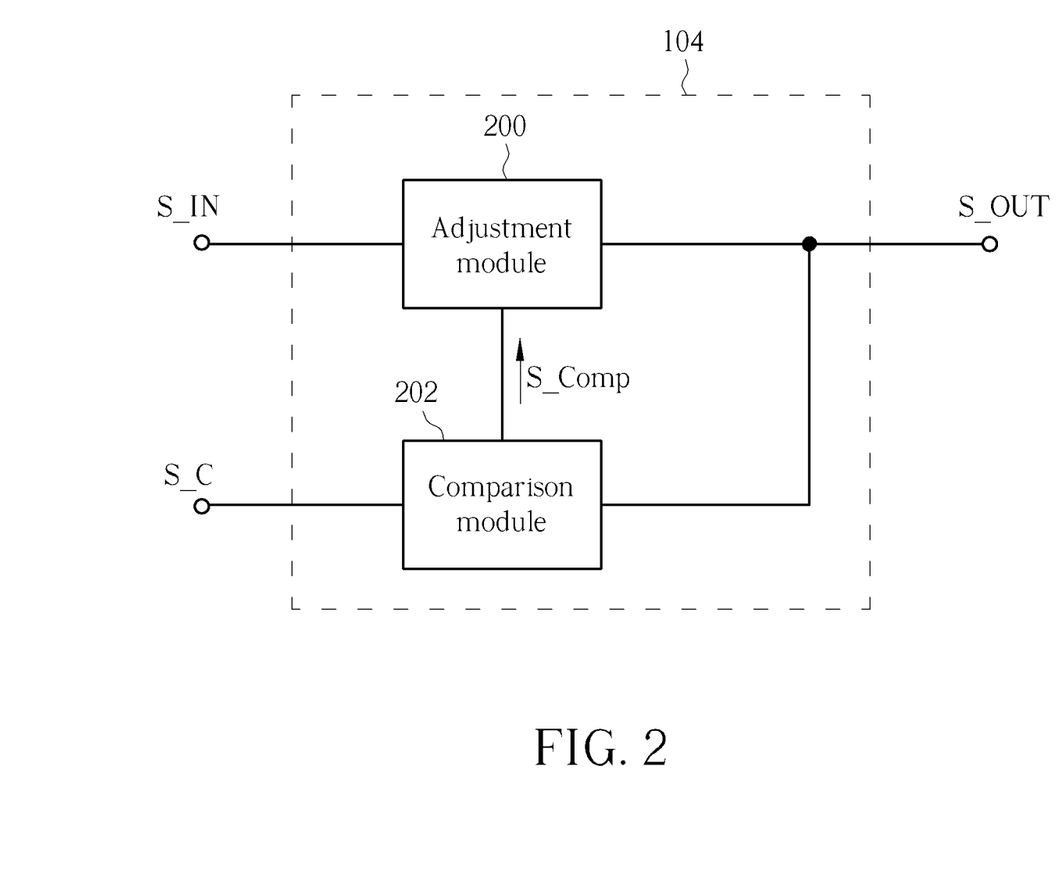
FIG. 2 illustrates a detailed schematic diagram of the output module shown in FIG. 1 according to an embodiment of the disclosure.

In the embodiment, the load module 106 comprises at least an internal resistor (not shown in the figure) and can be realized at least via a portable electronic device and a computer system. The output module 104 dynamically transforms the input signal S_IN into the output signal S_OUT to process the charging operation for the portable electronic device and the personal computer. Please refer to FIG. 2, which illustrates a detailed schematic diagram of the output module 104 shown in FIG. 1 according to an embodiment of the disclosure. As shown in FIG. 2, the output module 104 further comprises an adjustment module 200 and a comparison module 202. The adjustment module 200 is utilized for receiving the input signal S_IN and a comparison result S_Comp generated by the comparison module 202, so as to output the output signal S_OUT. The comparison module 202 has a predetermined threshold (not shown in the figure) and receives the control signal S_C as well as the output signal S_OUT, so as to compare differences between the threshold and the output signal S_OUT and to generate the comparison result S_Comp.

Noticeably, the comparison result of the embodiment can be classified into two cases. One of the cases is that the output signal S_OUT (i.e. the adjusted input signal S_IN) is not smaller than the threshold, and the other is that the output signal S_OUT is smaller than the threshold. When the comparison result shows that the output signal S_OUT is not smaller than the threshold, the adjustment module 200 determines an elevation result to correspondingly process an elevation operation for the input signal S_IN, i.e. increasing amounts of the input current or the power source. When the comparison result shows that the output signal S_OUT is smaller than the threshold, the adjustment module 200 determines a reduction result to correspondingly process a reduction operation for the input signal S_IN, i.e. decreasing amounts of the input current or the power source. Accordingly, the output module 104 determines to increase/decrease the amounts of the input signal S_IN according to the condition whether the input signal S_IN complies with the elevation result or the reduction result, and the output signal S_OUT is outputted to process the charging operation for the load module 106.

Figure 3:
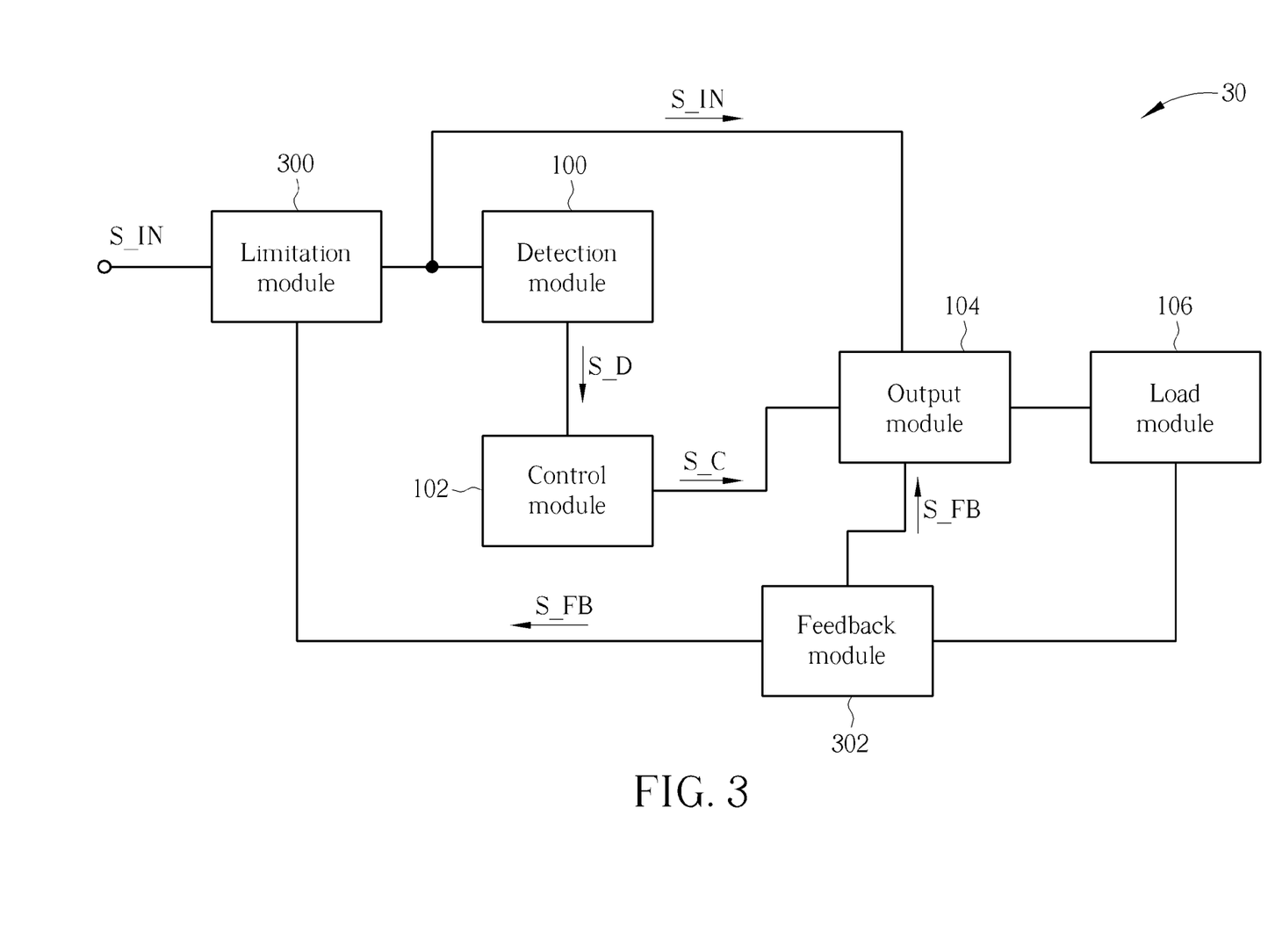
FIG. 3 illustrates a schematic diagram of a dynamic charging device according to another embodiment of the disclosure.

Please refer to FIG. 3, which illustrates a schematic diagram of a dynamic charging device 30 according to another embodiment of the disclosure. In comparison with the dynamic charging device 10 shown in FIG. 1, the dynamic charging device 30 shown in FIG. 3 further comprises a limitation module 300 and a feedback module 302, and the other elements of the dynamic charging device 30 are similar to those shown in FIG. 1 and FIG. 2, and are not described hereinafter. The limitation module 300 is utilized for receiving the input signal S_IN (i.e. the input current or the power source) to be transmitted to the detection module 100 or the output module 104. Also, the limitation module 300 predetermines a minimum operational signal not shown in the figure. Preferably, the feedback module 302 is coupled between the load module 106 and the limitation module 300, and generates a feedback signal S_FB to the limitation module 300 according to the charging operation of the load module 106, so as to adjust the minimum operation signal of the limitation module 300. Accordingly, the amounts of the input signal S_IN are adjusted to be not smaller than the minimum operation signal, so as to maintain a normal operation of the computer system. In the meanwhile, the portable electronic device coupled to the computer system can process the charging operation.

Figure 4:
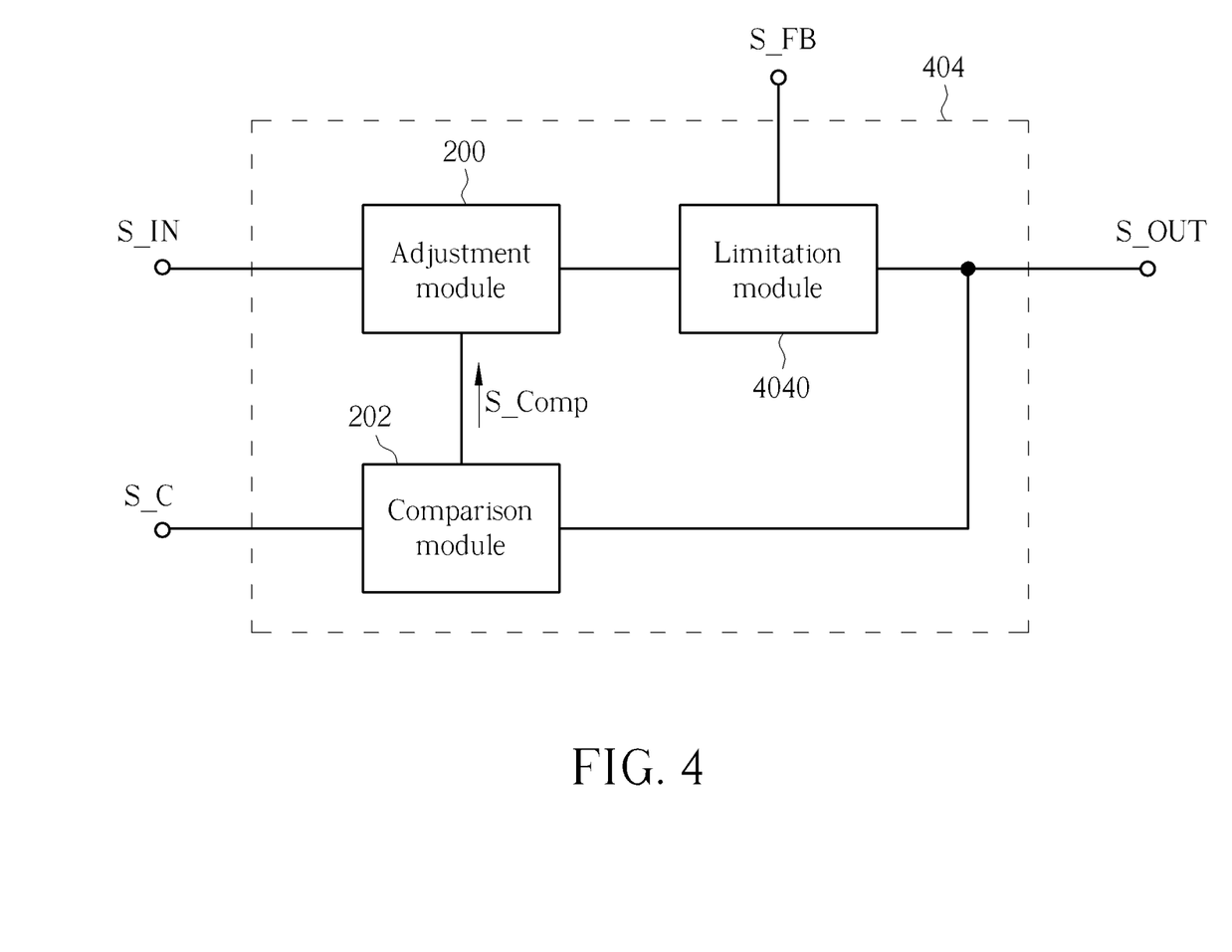
FIG. 4 illustrates a schematic diagram of another output module of the dynamic charging device shown in FIG. 3 according to an embodiment of the disclosure.

Please refer to FIG. 4, which illustrates a schematic diagram of another output module 404 of the dynamic charging device 30 shown in FIG. 3 according to an embodiment of the disclosure. In comparison with the output module 104 shown in FIG. 2, the output module 404 shown in FIG. 4 further comprises a limitation module 4040 to be coupled between the adjustment module 200 and the comparison module 202, and the other elements of the dynamic charging device 30 are similar to those shown in FIG. 1 and FIG. 2, and are not described hereinafter. As shown in FIG. 3 and FIG. 4, the limitation module 4040 is utilized to receive the feedback signal S_FB generated by the feedback module 302 and the adjusted input signal S_IN, and determines whether or not to adjust the amounts of the input signal S_IN to output the adjustable output signal S_OUT, so as to process the charging operation of the load module 106.

Figure 5:
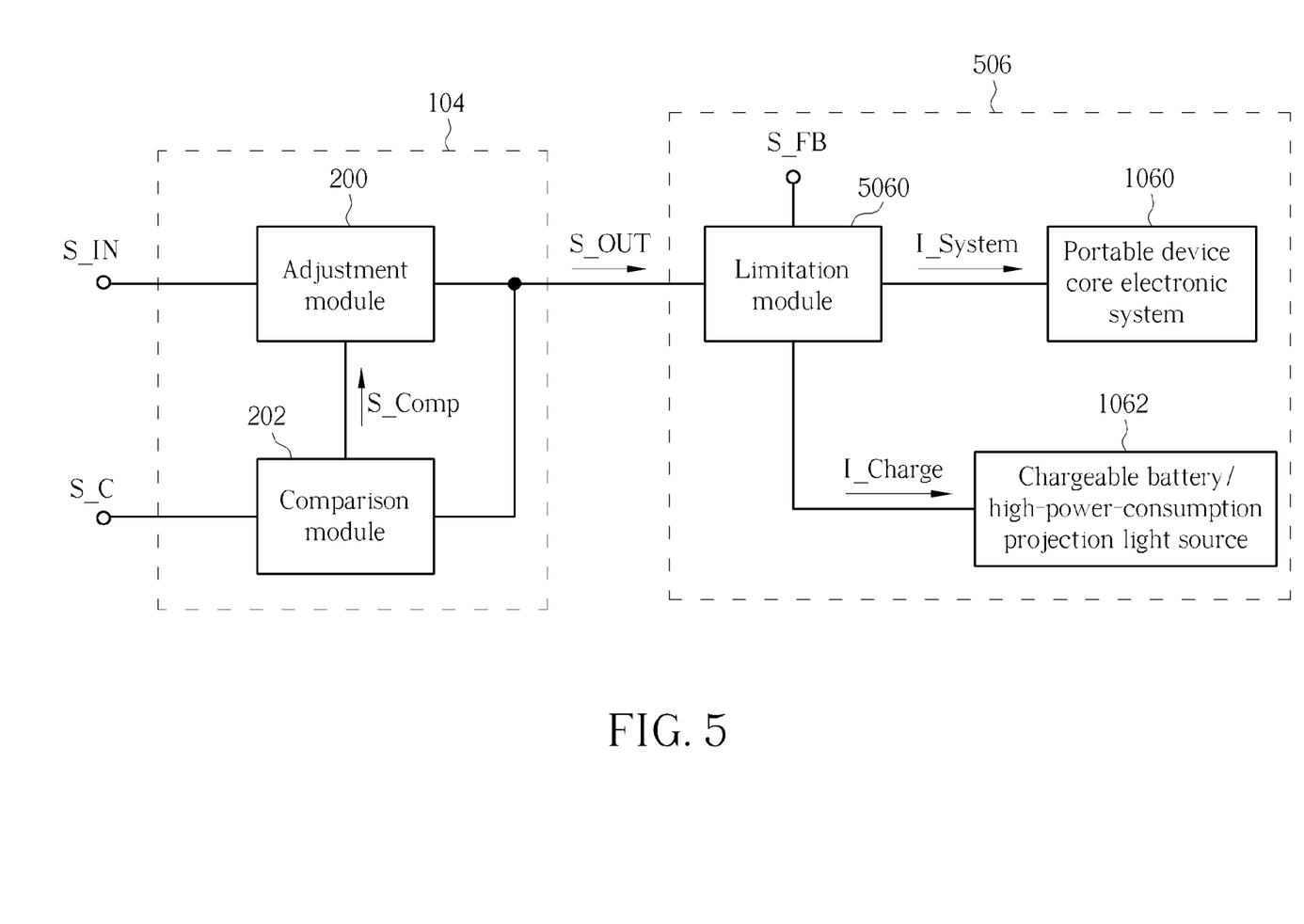
FIG. 5 illustrates a schematic diagram of another load module coupled to the output module shown in FIG. 2 according to an embodiment of the disclosure.

Please refer to FIG. 5, which illustrates a schematic diagram of another load module 506 coupled to the output module 104 shown in FIG. 2 according to an embodiment of the disclosure. As shown in FIG. 5, the load module 506 comprises a portable device core electronic system 1060 and at least a chargeable battery or a high-power-consumption projection light source 1062, and further comprises a limitation module 5060 coupled between the portable device core electronic system 1060 and the chargeable battery or the high-power-consumption projection light source 1062. The limitation module 5060 receives the feedback signal S_FB generated by the feedback module 302 shown in FIG. 3 to dynamically adjust the amounts of the output signal S_OUT, so as to output a system current I_System to the portable device core electronic system 1060 and a charging current I_Charge to the chargeable battery or the high-power-consumption projection light source 1062. The limitation module 5060 outputting the system current I_System not only maintains the normal operation of the portable device core electronic system 1060, but also dynamically adjusts the amounts of the charging current I_Charge to process the charging operation of the chargeable battery or the high-power-consumption projection light source 1062. Since the charging current I_Charge is dynamically increased/decreased, users can use a larger charging current, so as to shorten a charging period of the chargeable battery, or increase projection lights of the high-power-consumption projection light source, which also renders a larger application range of the dynamic charging device 10.

Simply put, according to the embodiments shown in FIG. 2 to FIG. 5, the disclosure provides a dynamic charging device, or a dynamic charging device coupled to a power source device, which generates the input current or the power source, as well as a master control device (i.e. the computer system in the embodiment) to form another dynamic charging system. First, the comparison module and the adjustment module of the output module dynamically increase or decrease the amounts of the input signal according to the detection signal, so as to output the output signal to process the adjustable charging operation of the load module, which comprises the portable electronic device and the computer system. Further, the output module and the limitation module utilize the feedback module, which generates the feedback signal, as well as the limitation module, which receives the input signal, to control the operational mechanism of the adjustable input signal. Certainly, another limitation module installed in the load module can also be utilized for dynamically adjusting the amounts of the input signal. Accordingly, the portable electronic device coupled to the computer system can dynamically receive the adjustable elevation/reduction charging current to have a larger charging current for shortening the charging period, and in the meanwhile, the computer system can be operated at the normal operation, which would provide more varieties of operation of the dynamic charging device or the dynamic charging system. Certainly, if the portable electronic device is realized as a projector or a lighting device, a larger operational current can be utilized without the limitation of the prior art processing the charging operation via the USB.

The embodiment of the disclosure can also be realized via separating the portable electronic device and the computer system, such that the portable electronic device and the computer system receive the charging current and the system current, respectively. In practice, the portable electronic device can be directly coupled to the computer system via the inter-integrated circuit (I2C) transmission interface or a serial peripheral interface (SPI), and is not limited to utilizing the USB connection. Thus, the computer system can directly receive the output signal (i.e. the adjusted input signal), and accordingly, another limitation module can be installed in the computer system to divide the output signal into the charging current and the system current to be supplied to the portable electronic device for the adjustable charging operation as well as to the computer system for the normal operation, respectively, which is also in the scope of the disclosure. Certainly, those skilled in the art can utilize the same conception of the dynamic charging device/system to provide a plurality of load modules with the adjustable charging operation. Under such circumstances, the embodiment of the disclosure has provided a larger application range in comparison with the prior art which passively utilizes the USB for limited charging operation.

Figure 6:
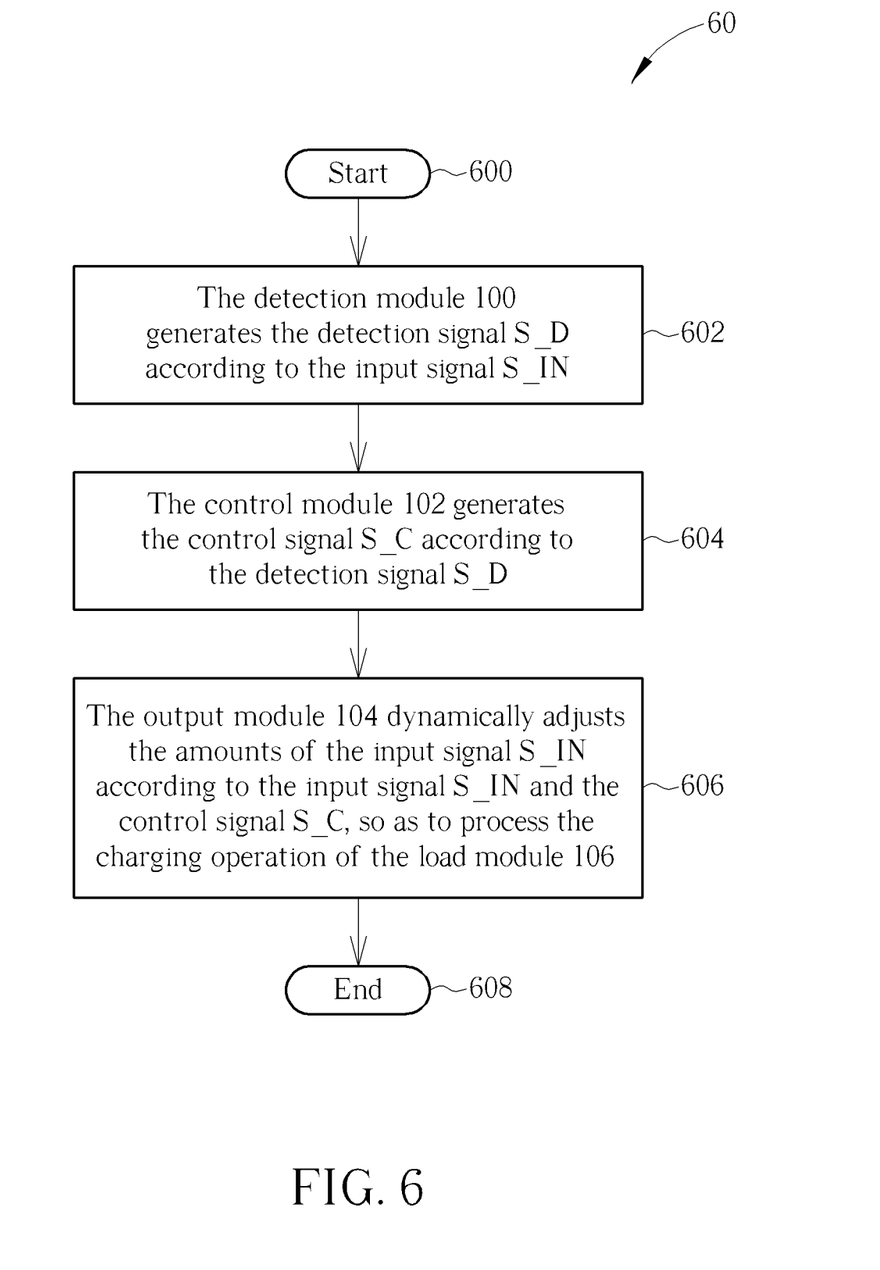
FIG. 6 illustrates a flow chart of a dynamic charging process according to an embodiment of the disclosure.

Further, related operations applied to the dynamic charging device/system can be summarized as a dynamic charging process 60, as shown in FIG. 6. The dynamic charging process 60 includes the steps as follows.

Step 600: Start.

Step 602: The detection module 100 generates the detection signal S_D according to the input signal S_IN.

Step 604: The control module 102 generates the control signal S_C according to the detection signal S_D.

Step 606: The output module 104 dynamically adjusts the amounts of the input signal S_IN according to the input signal S_IN and the control signal S_C, so as to process the charging operation of the load module 106.

Step 608: End.

The detailed operations of the dynamic charging process 60 can be understood from FIG. 1 to FIG. 5 and related paragraphs thereof, and is not described hereinafter. Certainly, those skilled in the art can adaptively modify/combine the operations of the control signal S_C, the feedback signal S_FB and the limitation module to cooperate with the output module 104 or other related limitation modules, so as to dynamically adjust the amounts of the input signal S_IN, which is also in the scope of the disclosure. Besides, from Step 602 to Step 606, the embodiment of the disclosure can utilize the I2C transmission interface, the SPI, the secure digital (SD) transmission interface or other one wire interface to process signal transmission between different modules, which is also in the scope of the disclosure.

Figure 7:
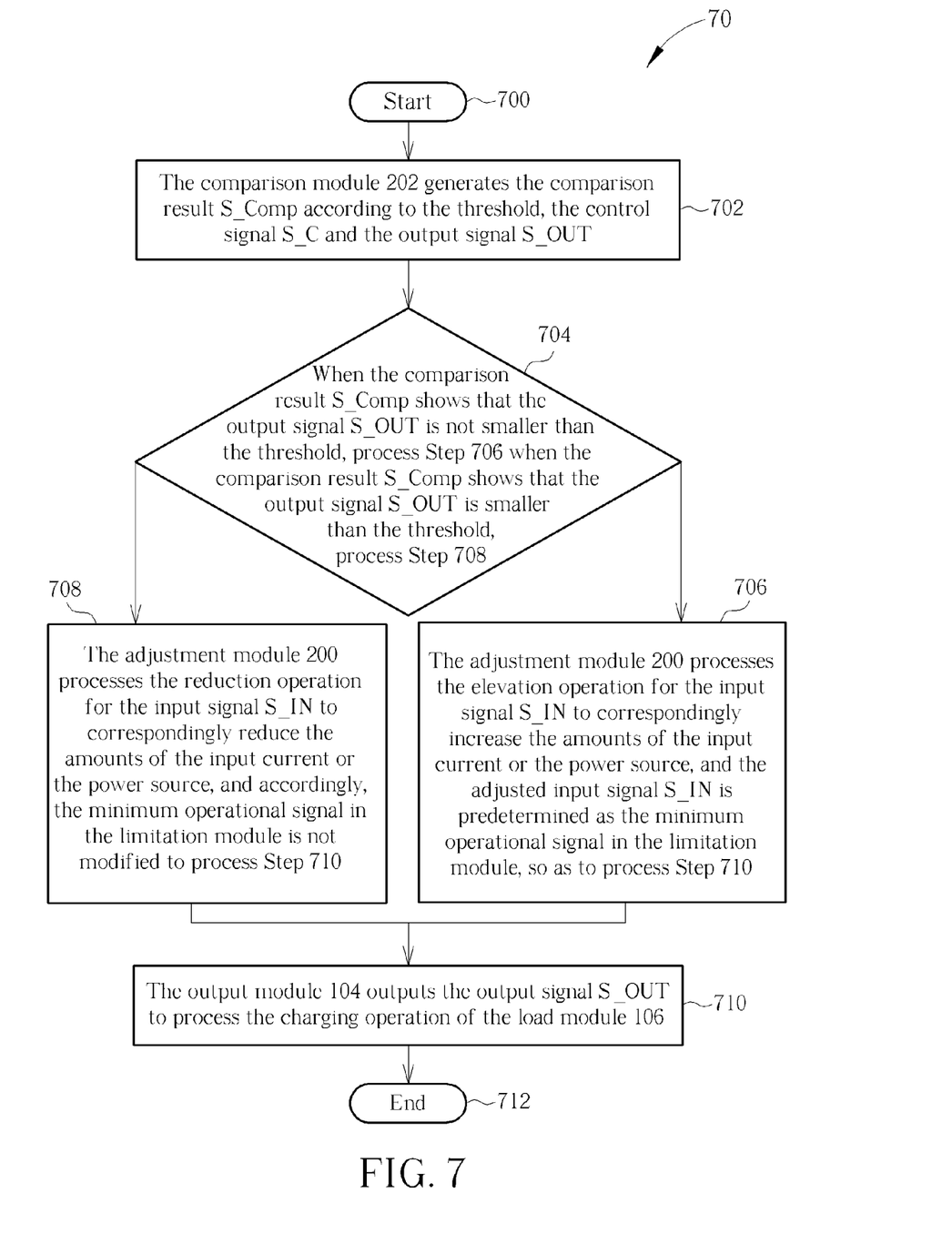
FIG. 7 illustrates a flow chart of an adjustment process according to an embodiment of the disclosure.

Further, Step 606 for dynamically adjusting the amounts of the input signal S_IN in the dynamic charging process 60 can be summarized as an adjustment process 70, as shown in FIG. 7. The adjustment process 70 includes the steps as follows.

Step 700: Start.

Step 702: The comparison module 202 generates the comparison result S_Comp according to the threshold, the control signal S_C and the output signal S_OUT.

Step 704: When the comparison result S_Comp shows that the output signal S_OUT is not smaller than the threshold, process Step 706; when the comparison result S_Comp shows that the output signal S_OUT is smaller than the threshold, process Step 708.

Step 706: The adjustment module 200 processes the elevation operation for the input signal S_IN to correspondingly increase the amounts of the input current or the power source, and the adjusted input signal S_IN is predetermined as the minimum operational signal in the limitation module, so as to process Step 710.

Step 708: The adjustment module 200 processes the reduction operation for the input signal S_IN to correspondingly reduce the amounts of the input current or the power source, and accordingly, the minimum operational signal in the limitation module is not modified to process Step 710.

Step 710: The output module 104 outputs the output signal S_OUT to process the charging operation of the load module 106.

Step 712: End.

The detailed operations of the adjustment process 70 can be understood from FIG. 1 to FIG. 6 and related paragraphs thereof, and is not described hereinafter. Certainly, in Step 706 and Step 708, those skilled in the art can adaptively add/combine the operations of the adjustment module 200 with another current step control module to sequentially add/reduce a fixed value of the input signal S_IN, e.g. 0.1 Ampere (Volt). Besides, setting the minimum operational signal in the limitation module can be dynamically adjusted according to the adjusted input signal S_IN, or be adaptively modified according to users' requirements, such that the portable electronic device as well as the computer system can be normally operated, which is also in the scope of the disclosure.

In summary, embodiments of the disclosure provide a dynamic charging device/system utilizing an output module to dynamically increase/reduce an input signal according to the input signal and a detection signal. Additionally, a feedback module or a limitation module can dynamically adjust operational mechanisms of the input signal according to a feedback signal, so as to process an adjustable charging operation for a load module, which not only shortens a charging period of a portable electronic device but also operates a computer system within a normal operation. If the portable electronic device is a projector or a lighting device, a larger operational current can be anticipated for the portable electronic device. In comparison with the prior art utilizing the USB for charging operation, the disclosure has no limits on the charging current and broadens the application range of the dynamic charging device/system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic charging device comprising:
    a detection module for generating a detection signal according to an input signal;
    a control module coupled to the detection module for generating a control signal according to the detection signal; and
    an output module coupled to the control module for dynamically adjusting amounts of the input signal according to the control signal and the input signal, so as to process a charging operation for a load module;
    wherein the input signal is an input current or a voltage source, and the load module further comprises a limitation module to connect a master control device and at least a portable electronic device in parallel, such that an adjustable current of the adjusted input signal is supplied to the portable electronic device and a fixed current of the adjusted input signal is supplied to the master control device.

2. The dynamic charging device of claim 1, wherein the output module further comprises a comparison module having a threshold, and the comparison module generates a comparison result according to the adjusted input signal, the threshold and the control signal.

3. The dynamic charging device of claim 2, wherein the output module further comprises an adjustment module for dynamically adjusting the amounts of the input signal according to the comparison result.

4. The dynamic charging device of claim 3, wherein when the comparison result is that the adjusted input signal is not smaller than the threshold, an elevation result is generated to increase the amounts of the input signal.

5. The dynamic charging device of claim 3, wherein when the comparison result is that the adjusted input signal is smaller than the threshold, a reduction result is generated to decrease the amounts of the input signal.

6. The dynamic charging device of claim 1, further comprising a feedback module for generating a feedback signal according to the charging operation of the load module.

7. The dynamic charging device of claim 6, further comprising a limitation module for receiving the input signal and predetermining a minimum operational signal.

8. The dynamic charging device of claim 7, wherein the limitation module dynamically adjusts the minimum operational signal according to the feedback signal, so as to prevent the input signal from being smaller than the minimum operational signal.

9. The dynamic charging device of claim 6, wherein the output module further comprises a limitation module for adjusting the amounts of the input signal according to the feedback signal.

10. The dynamic charging device of claim 6, wherein the load module further comprises a limitation module for adjusting the amounts of the input signal according to the feedback signal.

11. The dynamic charging device of claim 10, wherein the load module further comprises a master control device and at least a portable electronic device, and the portable electronic device processes the charging operation according to the adjusted input signal.

12. A dynamic charging method for a dynamic charging device comprising:
   generating a detection signal according to an input signal;
   generating a control signal according to the detection signal; and
   dynamically adjusting amounts of the input signal according to the control signal and the input signal, so as to process a charging operation for a load module;
   wherein the input signal is an input current or a voltage source, and the load module further comprises a limitation module to connect a master control device and at least a portable electronic device in parallel, such that an adjustable current of the adjusted input signal is supplied to the portable electronic device and a fixed current of the adjusted input signal is supplied to the master control device.

13. The dynamic charging method of claim 12, further comprising generating a comparison result according to the adjusted input signal, a threshold and the control signal.

14. The dynamic charging method of claim 13, further comprising dynamically adjusting the amounts of the input signal according to the comparison result.

15. The dynamic charging method of claim 14, wherein when the comparison result is that the adjusted input signal is not smaller than the threshold, an elevation result is generated to increase the amounts of the input signal.

16. The dynamic charging method of claim 14, wherein when the comparison result is that the adjusted input signal is smaller than the threshold, a reduction result is generated to decrease the amounts of the input signal.

17. The dynamic charging method of claim 12, further comprising generating a feedback signal according to the charging operation of the load module.

18. The dynamic charging method of claim 17, further comprising utilizing a limitation module for receiving the input signal and predetermining a minimum operational signal.

19. The dynamic charging method of claim 18, wherein the limitation module dynamically adjusts the minimum operational signal according to the feedback signal, so as to prevent the input signal from being smaller than the minimum operational signal.

20. The dynamic charging method of claim 17, further comprising utilizing a limitation module for adjusting the amounts of the input signal according to the feedback signal.

21. The dynamic charging method of claim 17, wherein the load module further utilizes a limitation module for adjusting the amounts of the input signal according to the feedback signal.

22. The dynamic charging method of claim 21, wherein the load module further comprises a master control device and at least a portable electronic device, and the portable electronic device processes the charging operation according to the adjusted input signal.

\* \* \* \* \*